United States Patent [19]

Akiyama et al.

[11] 4,400,074

[45] Aug. 23, 1983

[54] AUTOMATIC REWINDING CAMERA

[75] Inventors: Kazuhiko Akiyama; Takeshi Yoshino; Michihiro Shiina; Shigeo Sato; Tetsuo Nishizawa; Toshio Yoshida; Nobuo Kobayashi, all of Omiya, Japan

[73] Assignee: Fuji Photo Optical Co., Ltd., Saitama, Japan

[21] Appl. No.: 353,031

[22] Filed: Mar. 1, 1982

[30] Foreign Application Priority Data

| Feb. 27, 1981 | [JP] | Japan | 56-26731 |
| Mar. 2, 1981 | [JP] | Japan | 56-28365 |
| Mar. 2, 1981 | [JP] | Japan | 56-28369 |
| Mar. 9, 1981 | [JP] | Japan | 56-32476 |
| Mar. 16, 1981 | [JP] | Japan | 56-35397[U] |
| Mar. 16, 1981 | [JP] | Japan | 56-35400[U] |
| Mar. 16, 1981 | [JP] | Japan | 56-36473 |
| Mar. 16, 1981 | [JP] | Japan | 56-36474 |

[51] Int. Cl.³ .................. G03B 1/18; G03B 17/36; G03B 17/42
[52] U.S. Cl. .................. 354/173; 354/206; 354/213; 354/214; 354/217
[58] Field of Search .......... 354/50, 51, 171, 173, 354/204–206, 213, 214, 215, 217, 218, 268; 352/170–172

[56] References Cited

U.S. PATENT DOCUMENTS

| 3,646,867 | 3/1972 | Ono | 354/205 |
| 4,021,828 | 5/1977 | Iura et al. | 354/217 |
| 4,105,310 | 8/1978 | Hirata et al. | 352/171 |
| 4,294,527 | 10/1981 | Hashimoto et al. | 354/173 X |
| 4,306,794 | 12/1981 | Fukahori et al. | 354/173 |

Primary Examiner—William B. Perkey
Attorney, Agent, or Firm—Young & Thompson

[57] ABSTRACT

An automatic rewinding camera wherein an automatic advance of the photographic film by one frame is caused by shutter release operation and rewinding of the photographic film is automatically started when the film is prevented from further advance. The camera has a film-driven sprocket wheel, by the rotation of which film movement signals are produced. A timer circuit maintains, during the passage of a predetermined active time which is shorter than the time required to advance the photographic film by one frame, the camera motor in forward rotation so as to advance the photographic film. The timer circuit is reset by the film movement signals. But when those film signals stop, that is, when the film is fully extended from the cartridge, then the timer is not reset; and the measurement of the full predetermined active time, by the timer, without resetting, results in the motor being reversed to rewind the film.

25 Claims, 16 Drawing Figures

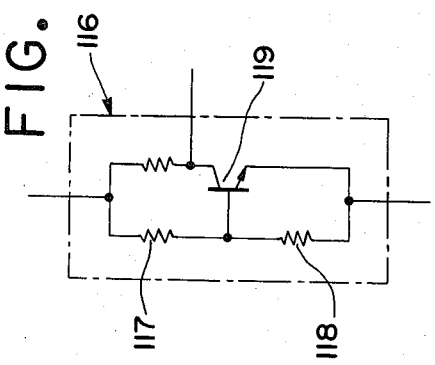
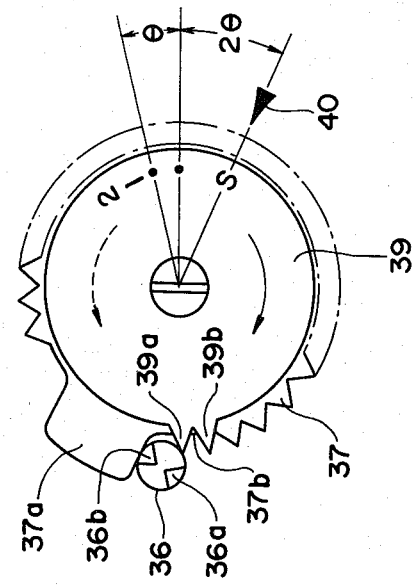
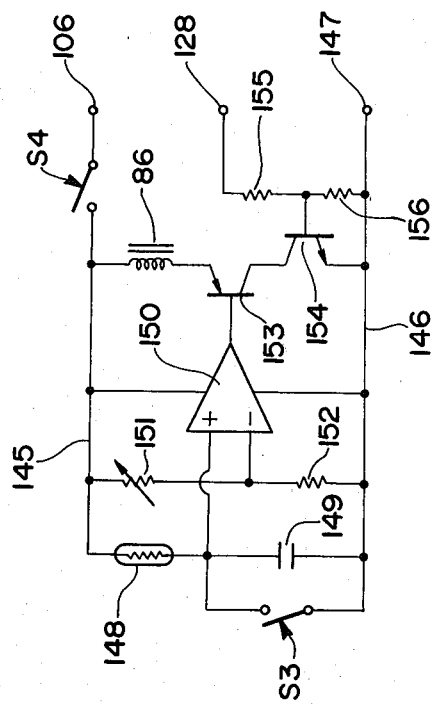

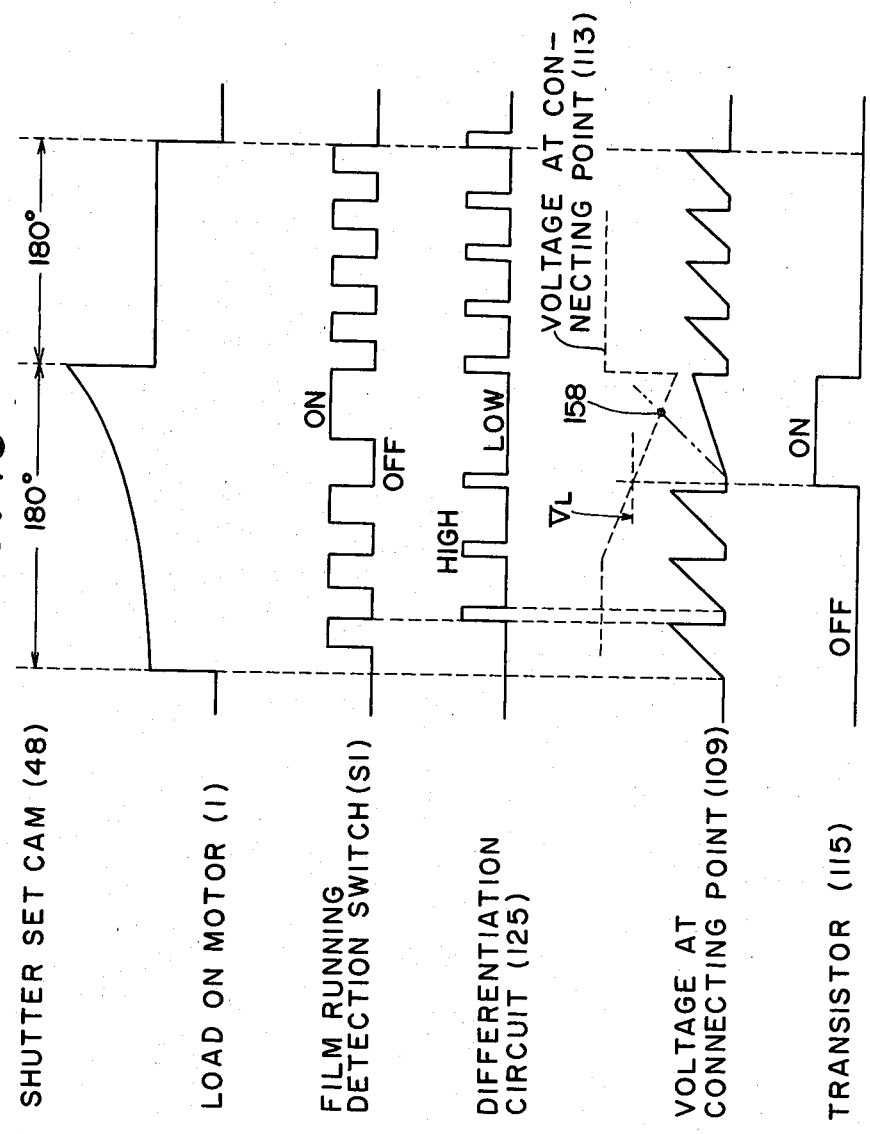

AUTOMATIC REWINDING CAMERA

BACKGROUND OF THE INVENTION

The present invention relates to an automatic rewinding camera wherein a motor is automatically reversed to rewind a photographic film when the film is prevented from further advance, that is, when the film is fully withdrawn from its cartridge.

Motor driven cameras which have an electric motor built in for advancing and/or rewinding a photographic film are well known in the art. In such motor driven cameras, there is the advantage that the photographer is required only to depress the shutter release button for releasing the shutter and advancing the photographic film, and is not obliged to maintain a rewind button depressed. An automatically rewinding apparatus for cameras is disclosed in Japanese utility model application No. 53-93128 and is adapted automatically to rewind the photographic film after detecting that the photographic film is fully exposed. In this camera, a timer circuit provides an active time shorter than the time required for advancing the film one frame. A motor which is built into the camera is reversed after the lapse of the time provided by the timer circuit. As the photographic film has one end fixed to a spool shaft in the cartridge, the photographic film is prevented from further advance when it is fully exposed. Consequently the timer circuit becomes operative to reverse the motor after the lapse of the active time. However, the perforations along the film are often torn by the drive sprocket wheel when the film is prevented from further advance. Furthermore, since the drive sprocket wheel continues to rotate, false film running signals are produced so as to maintain the motor rotating in the film advance direction although the film is prevented from advancing, and thus the film rewinding operation will not be initiated. This will cause the photographer to believe he still has unexposed film, and to miss the exposures he attempts to make while under this false impression.

OBJECTS OF THE INVENTION

A principal object of the present invention is to provide an automatic rewinding camera in which the photographic film is rewound even if the perforations therealong are accidentally torn.

Another object of the present invention is to provide an automatic rewinding camera which is, for demonstration purposes, operable to actuate the film advancing mechanism for several frames of film even when the camera is unloaded.

Still another object of the present invention is to provide an automatic rewinding camera which is adapted to perform a film advance only by a shutter release operation.

A further object of the present invention is to provide an automatic rewinding camera in which a simple motor energizing circuit is provided to control a motor both in forward and in reverse rotation.

A still further object of the present invention is to provide an automatic rewinding camera in which a switch for controlling the film advance by one frame is reliable in operation.

Yet another object of the present invention is to provide an automatic rewinding camera in which a switch is operatively associated with a counter device.

It is also an object of the present invention to provide an automatic rewinding camera in which the shutter mechanism is prevented from undesired actuation during rotation of the motor.

Finally, it is an object of the present invention to provide an automatic rewinding camera in which the motor is prevented from being reversed to rewind the photographic film when the power source is too low in supply voltage.

SUMMARY OF THE INVENTION

These and other objects of the present invention are achieved in an automatic rewinding camera according to the present invention wherein there is provided a rotatable means driven by a photographic film and signal producing means for producing first signals during the time the rotatable means is driven, said first signals being applied to and resetting a timer means which provides an active time or working time which is shorter than the time required to advance the photographic film one frame and in the absence of which the motor rotates in the forward direction.

In a preferred embodiment of the present invention, the timer means can be selectively operative with first and second active times, said first active time being shorter than that required to advance a photographic film one frame and said second active time being longer than the first active time. Furthermore, the timer means can be set so as to be operable with either said second active time until a photographic film is advanced to the Nth frame, or with said first active time for the further frames. This allows an unloaded camera to operate until a frame number "N" on a counter disk is indicated, and in order to demonstrate the camera in stores.

When the photographic film is automatically and fully rewound, a film advancing switch which is adapted to be turned off by advancing one frame of film and to be turned on after a shutter actuation, is in the turned-off state and the shutter apparatus is in the cocked state. Therefore, the loaded camera can be started to advance the photographic film only by actuating the shutter release means.

BRIEF DESCRIPTION OF THE DRAWINGS

Other objects and advantages of the present invention will become apparent to those skilled in this art from a consideration of the following description taken in connection with the accompanying drawings, in which:

FIG. 6 is a plan view of the counter device of FIG. 4;

FIG. 8 is a diagram of a voltage detection circuit shown in block 116 in FIG. 7;

FIG. 9 is a diagram of a shutter control circuit used with the motor control circuit of FIG. 7;

FIG. 13 is a timing chart of the motor control circuit of FIG. 7, wherein the apparatus with the power source too low in voltage is in a film advancing state;

DETAILED DESCRIPTION OF THE INVENTION

Figure 1:
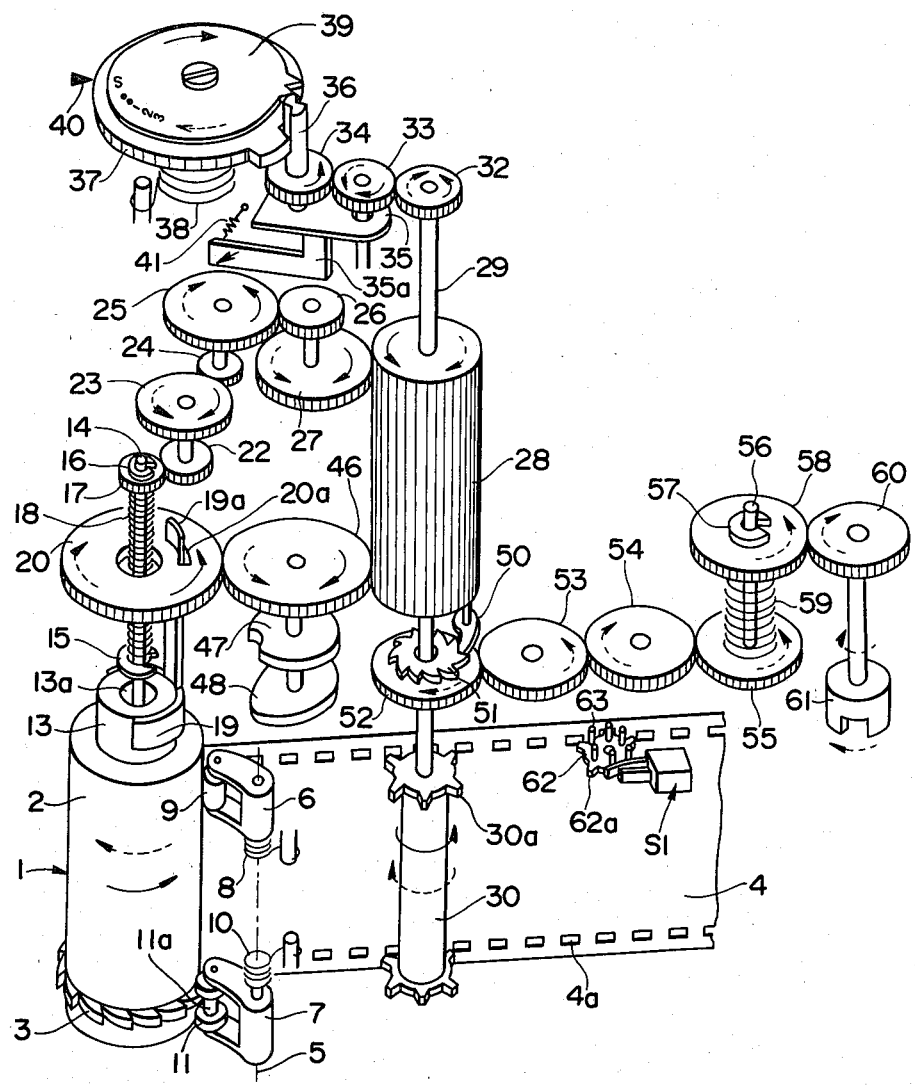
FIG. 1 is a schematic perspective view of film advancing and rewinding apparatus according to the present invention.

Referring now to the drawings in greater detail, in FIG. 1 which illustrates a first embodiment of this invention, a camera driving motor 1 is provided which is housed in a take-up spool 2 for the purpose of miniaturization. That is to say, the take-up spool 2 which is used as a stator has a rotor accommodated therein. The take-up spool 2 on its lower portion is provided with a plurality of teeth 3 engageable in perforations 4a of a photographic film 4.

A shaft 5 parallel to the take-up spool 2 pivotally mounts rotatable suppoert arms 6 and 7 with guide rollers 9 and 11 supported at the upper and lower end portions thereof. The upper support arm 6 is biased by a spring 8 in the counterclockwise direction as seen in FIG. 1 so as to force the guide roller 9 against an outer surface of the take-up spool 2, thereby preventing the photographic film 4 wound around the take-up spool 2 from loosening. In the same manner, the lower support arm 7 is biased by a spring 10 in the counterclockwise direction. The arm-supported guide roller 11 has a portion 11a of reduced diameter confronting the teeth 3. Flanges on the guide roller 11 serve to press against the film on opposite sides of the lower perforations 4a. As a result, the guide roller 11 causes the photographic film 4 to be engaged with the teeth 3 through perforations 4a.

On the top of the take-up spool 2 is rigidly secured a spool shaft 13 having a hole 13a through which a rotary output shaft 14 of the motor 1 projects upwardly. The rotary shaft 14 is provided with two E-shaped rings 15 and 16 spaced apart from each other by an appropriate distance. On rotary shaft 14 between the rings 15 and 16 is loosely fitted a drive gear 17 which is forced against the upper ring 16 by a spring 18 so as to provide frictional engagement between the rotary shaft 14 and the drive gear 17. Consequently, rotation of the rotary shaft 14 cannot be transmitted to the drive gear 17 when a torque above a specified value is applied to the latter.

Around the spool shaft 13 is fitted a cylindrical leaf spring 19 with an upwardly extending projection 19a that fits into an opening 20a formed in a spool drive gear 20. By means of the cylindrical leaf spring 19, a frictional coupling is established between the spool drive gear 20 and the take-up spool 2 so that the spool drive gear 20 is caused to idle with the exertion of a certain torque on the take-up spool 2. The friction coupling between the spool drive gear 20 and the take-up spool 2 produces a frictional force weaker than that between the rotary shaft 14 and the drive gear 17.

The rotary motion of the drive gear 17 is transmitted to a gear 28 through a reduction gear train comprising gears 22, 23, 24, 25, 26 and 27. The gear 28, which is integral with a sprocket shaft 29, causes the sprocket shaft 29 to rotate when the motor 1 is actuated. A drive sprocket wheel 30 integral with the sprocket shaft 29 has teeth 30a engageable with perforations 4a of the photographic film 4 so as to move the photographic film 4 one frame for every revolution of wheel 30, through an angle of 480° in the direction shown by the solid arrow during the film advancing operation.

Fixed to the top of the sprocket shaft 29 is a gear 32 which drives a gear 34 through a gear 33. These gears 33 and 34 are arranged on a counter reset lever 35. The gear 34 is integral with intermittent feed shaft 36 which has two V-shaped grooves which are different in length from each other, said shaft 36 being adapted to mesh with the teeth of a gear 37 so that the gear 37 turns against the action a spring 38 by one pitch every time the intermittent feed shaft 36 makes one revolution. Thus, a counter disk 39 integral with the gear 37 is caused to advance by one pitch for each revolution of the gear 37 against the action of the spring 38 which is provided for resetting the counter disk 39. As a result of this, a numeral on the counter disk 39 in alignment with an index 40 indicates the number of frames exposed.

The counter reset lever 35 is provided with a detection means 35a for detecting the opening and closing of the camera cover door (not shown). On closing the cover door, the detecting means 35a, which is forced to move against the action of a spring 41 in the direction shown by an arrow, causes the counter reset lever 35 to rotate counterclockwise as seen in FIG. 1 so as to bring the intermittent feed shaft 36 into mesh with the gear 37. Contrarywise, upon opening the cover door, the counter reset lever 35 is returned to disengage the intermittent feed shaft 36 from the gear 37. At this time, the spring-biased gear 37 with the counter disk 39 will return to its initial position to display a symbol "S" meaning the start position.

The gear 28 is also engaged with a gear 46 which is engaged with the spool drive gear 20. A rotation of the gear 28 through 480° which is required to advance the photographic film 4 one frame causes the gear 46 to rotate one full rotation, that is, 360°. On the same shaft with the gear 46 are fixed cam means 47 and 48 for controlling film advancing and shutter setting, respectively.

A pawl 50 which is mounted on and below the gear 28 engages with an rotates a ratchet wheel 51 with a gear 52 secured thereunder, in the direction shown by a dotted arrow, only when the photographic film 4 is advanced. The gear 52 rotates a gear 55 through gears 53 and 54. A shaft 56 at one end of which the gear 55 is rigidly mounted is provided with a gear 58 frictionally held between an E-shaped ring 57 fixed to shaft 56 and an expansible spring 59. Thus the gears 55 and 58 are frictionally coupled by the spring 59 so that the gear 55 is caused to idle with the exertion of a certain torque on the gear 58. Furthermore, the gear 58 is engaged with a gear 60 on which a shaft with a coupling flange 61 formed at one end is provided. The coupling flange 61 is engageable with a complementary flange formed at a top of the spool shaft in the film cartridge (not shown).

For the purpose of sensing film running, a driven sprocket wheel 62 with teeth 62a engageable with perforations 4a of the photographic film 4 is provided. Alternatively, it is possible to use a roller rotatable by the photographic film. The driven sprocket wheel 62 is provided with a plurality, for instance six, of pins 63 which cause a switch S1 for sensing film running to turn on and off repeatedly during rotation of the driven sprocket wheel 62, thereby generating film running signals.

Figure 2:
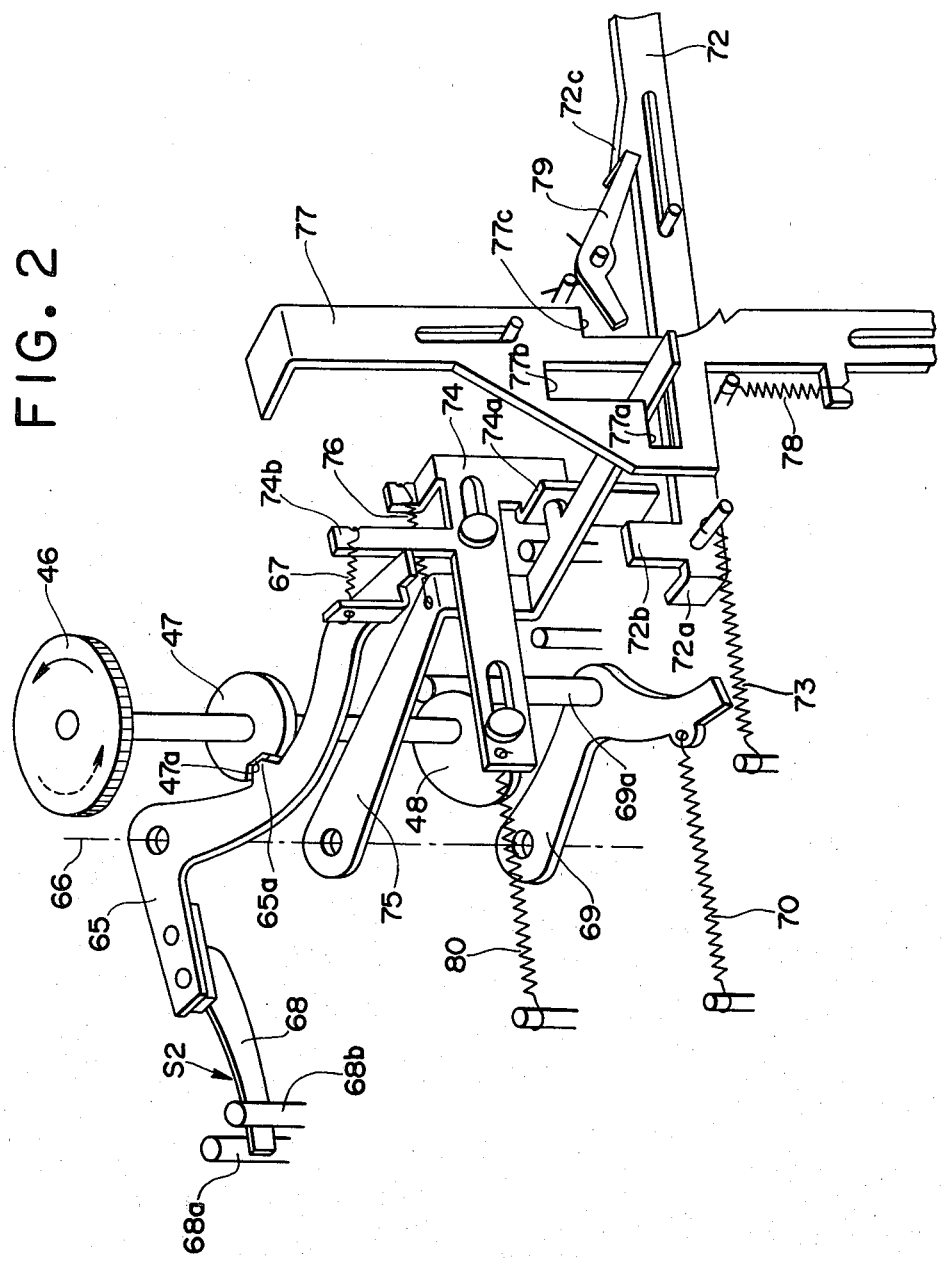
FIG. 2 is a schematic perspective view showing a shutter cocking and film advance control apparatus according to the present invention.

In FIG. 2, a control lever 65 for advancing a photographic film 4 one frame is pivotably mounted on a shaft 66 so that a projection 65a on the control lever 65 enters a notch 47a formed on the periphery of the control cam 47 through the action of tension spring 67, simultaneously swinging a moving contact 68 of a switch S2 for controlling the motor to start and stop the same, from a contact 68a to a contact 68b, respectively. When the moving contact 68 is in contact with the contact 68b, an energizing circuit for motor 1 in the forward direction is cut off. This state is called the "OFF" state, and the alternative state wherein the moving contact 68 is in contact with the contact 68a is called the "ON" state.

The shutter set cam 48, in the form of an eccentric cam, in this embodiment is contacted by a pin 69a of a shutter set lever 69. The shutter set lever 69 is pivotally moved counterclockwise as seen in FIG. 2 against the action of a spring 70 during half of the revolution of the shutter set cam 48 and is pivotally moved clockwise during the other half revolution. Therefore the shutter set lever 69 reciprocates once for every revolution of the shutter set cam 48.

When the shutter set lever 69 is pivotally moved counterclockwise, the free end thereof pushes a shutter actuating lever 72, via a portion 72a bent in L-shape, to the right in FIG. 2. The shutter actuating lever 72 is adapted to cock the shutter apparatus when moving to the right and to trip the shutter apparatus when returning under the restoring force of a spring 73. The movement of the shutter actuating lever 72 to the right causes a lever 74 to move to the right by the engagement of a projection 72b with a bent leg 74a. The movement of the lever 74 to the right causes a stop lever 75 to swing counterclockwise via a spring 76 interconnecting 74 and 75 and biases a spring 67 that interconnects the lever 74 and the control lever 65.

A shutter release lever 77 is formed with an L-shaped slot comprising horizontal and vertical slots 77a and 77b in which the free end of the stop lever 75 is disposed. When the shutter apparatus is cocked, the free end of the stop lever 75 is engaged with the vertical slot 77b. In that state, the depression of the shutter release lever 77 downward against the action of a spring 78 causes disengagement between a lock lever 79 and the shutter actuating lever 72, allowing the shutter actuating lever 72 to move to the left as seen in FIG. 2. After the return of the shutter release layer 77 to its initial raised position by means of biasing spring 78, the engagement of the free end of the stop lever 75 with the horizontal slot 77a allows the lever 74 to move to the left under the action of spring 80 as the lever 74 swings the stop lever 75 clockwise. When the lever 74 moves to the left, the vertical projection 74b of the lever 74 forces the free end of the control lever 65 to move clockwise so as to disengage the projection 65a from the notch 47a of the control cam 47. It is to be noted that the springs 76 and 67 are not biased as the lever 74 returns.

Figure 3:
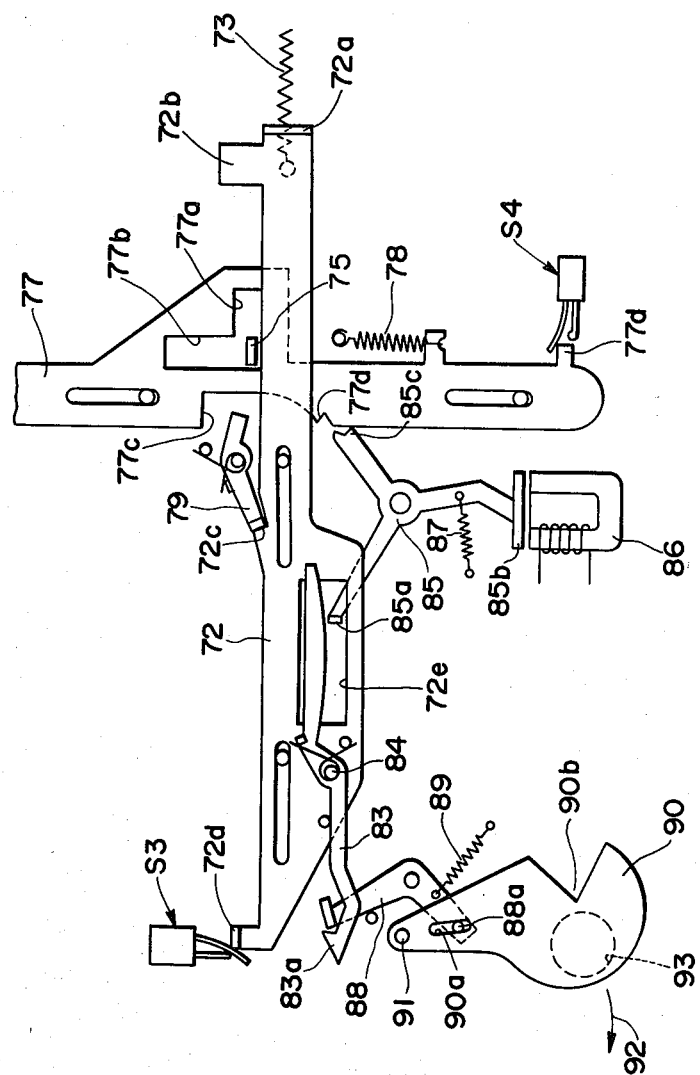
FIG. 3 is a rear elevational view of a shutter apparatus used in one embodiment of the present invention.

FIG. 3 illustrates the shutter apparatus. It should be noted that the indications of direction in this figure are reversed as compared to FIG. 2. The shutter actuating lever 72 is moved to the left against the spring 73, being engaged by the lock lever 79 while at the same time closing a switch S3 for an integration circuit of the shutter control circuit. An exposure control lever 83 which is rotatably attached through a shaft 84 to the shutter actuating lever 72 has one end with a hook 83a and the other end overlying an opening 72e provided in the shutter actuating lever 72. A bent end 85a of a trifurcated armature lever 85 is disposed within the opening 72e. The trifurcated armature lever 85 can rotate clockwise by means of a spring 87 so that the bent end 85 forces the exposure control lever 83 to rotate counterclockwise when a magnet 86 is deenergized, thus releasing an armature 85b. The shutter actuating lever 72 with the exposure control lever 83 moves with the hook 83a engaged with an end of a lever 88 to the right as seen in FIG. 3 to rotate the lever 88 clockwise. When the end of the lever 88 is disengaged from the hook 83a, the lever 88 will rotate counterclockwise under the influence of spring 89. A shutter blade 90, which coacts with the lever 88 through a pin 88a-slot 90a connection, is caused by the lever 88 to rotate about a shaft 91 in the direction shown by an arrow 92 so as to vary an opening defined by an aperture 93 and a sector 90b, said opening regulating the amount of light which falls therethrough on a photographic film 4.

The shutter release lever 77 is formed with a V-shaped notch 77d under a cut off portion 77c into which an end of the lock lever 79 is allowed to enter. The engagement between a hook 85c of the trifurcated armature lever 85 and the V-shaped notch 77d prevents the shutter release lever 77 from being depressed so as to prevent the shutter apparatus from operating, said engagement occuring when the magnet 86 is not energized. At the beginning of the depression the shutter release lever 77, a power supply switch S4 of the shutter control circuit is closed.

Figure 4:
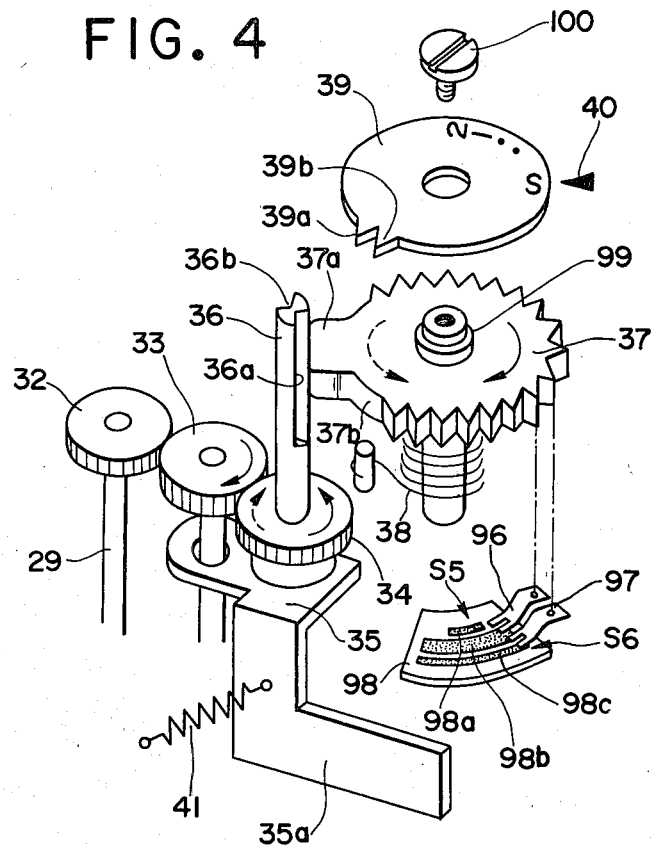
FIG. 4 is an exploded perspective view showing the counter device of FIG. 1.

FIG. 4 shows a counter device. In general, in a device which is adapted to open and close many switches for controlling various operations of camera mechanisms by using a counter device, there is the disadvantage that it is difficult to adjust the timing with which switches are turned on and off, thereby to obtain accuracy of timing since the amount of movement of a ratchet wheel and/or a counter disk is very small in pitch, for instance, about 7° of rotation and about 0.4 mm in magnitude. Consequently, the counter device shown in FIG. 4 has the advantage that a single revolution of the intermittent feed shaft 36 can cause the ratchet wheel 37 and the counter disk 39 to advance several pitches. The intermittent feed shaft 36 is provided with two V-shaped grooves 36a and 36b 180° apart. The ratchet wheel 37 which is engaged by the intermittent feed shaft 36 is provided on its under surface with a slide brush 96 of a switch S5 for controlling preparatory film advancement and a slide brush 97 of a timer switch S6 for selectively changing the active time of a timer circuit. The slide brush 96 is adapted slidably to contact a contact 98a and a common contact 98b on a base plate 98 and the other slide brush 97 is adapted slidably to contact a contact 98c and the common contact 98b on the base plate 98. The preparatory film advancing switch S5 is adapted to close during the advancement of a second preparatory frame of film (the term "preparatory frame" means a beginning frame which is not to be exposed) and to open during the advancement of a first actual frame of film (the term "actual frame" means a frame which is to be exposed). The timer switch S6 is adapted to be ON between the first preparatory frame and any actual frame, for instance third actual frame, and before the twelfth frame of film, which is the minimum number of frames of any film on the market. The counter disk 39 is rigidly fitted on the boss of the shaft 99 on the ratchet wheel 37 by means of a set screw 100. Two teeth 39a and 39b provided on the periphery of the counter disk 39 are engageable with the V-shaped grooves 36a and 36b the intermittent feed shaft 36.

Figure 5:
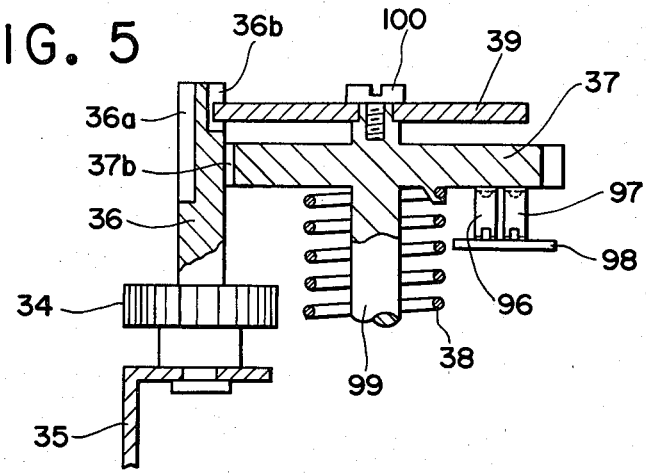
FIG. 5 is a partially sectional view of the counter device of FIG. 4.

FIG. 5 illustrates the counter device in section. The V-shaped groove 36a of the intermittent feed shaft 36 is relatively greater in length so as to engage with teeth of either the ratchet wheel 37 or the counter disk 39. The other V-shaped groove 36b is shorter than 36a so as to engage with teeth of the counter disk only.

In the counter device illustrated in plan view in FIG. 6, the ratchet wheel 37 is provided with a positioning projection 37a and a toothless portion 37b. The toothless portion 37b is located under the teeth 39a and 39b of the counter disk 39. It is to be noted that the tooth 39b may be omitted when the ratchet wheel 37 is provided with a tooth located at a position corresponding to that of the tooth 39b. The positioning projection 37a is in contact with the intermittent feed shaft 36 when a photographic film 4 is located within the camera.

When the motor 1 rotates to advance the second preparatory frame of photographic film 4, the intermittent feed shaft 36 turns fully once so as to cause the counter disk 39 and the ratchet wheel 37 to rotate by two teeth in the direction shown by a solid arrow in FIG. 6, as the V-shaped grooves 36a and 36b are brought into engagement with the teeth 39a and 39b, respectively. When advancing the third preparatory frame of the photographic film 4, the intermittent feed shaft 36 with its V-shaped groove 36b disengaged from the counter disk 39 provides engagement between the V-shaped groove 36a and a tooth of the ratchet 37. In that state, one revolution of the intermittent feed shaft 36 causes the ratchet wheel 37 and counter disk 39 to rotate by an increment of one tooth. As is apparent from the description above, the ratchet wheel 37 and the counter disk 39 are adapted to rotate through an angle of $2\theta$ when the second preparatory frame is advanced to the exposure position, and through an angle of $\theta$ when the third preparatory frame and subsequent frames of film are advanced. During the rotation of the ratchet wheel 37 through an angle of $2\theta$, the slide brush 96 comes into contact with the contact 98a and the common contact 98b to close the preparatory film advancing switch S5. As a result of this, the accuracy of timing with which switches are actuated to open and close can be increased since a large amount of rotation of the ratchet wheel 37 and the counter disk 39 is involved.

Figure 7:
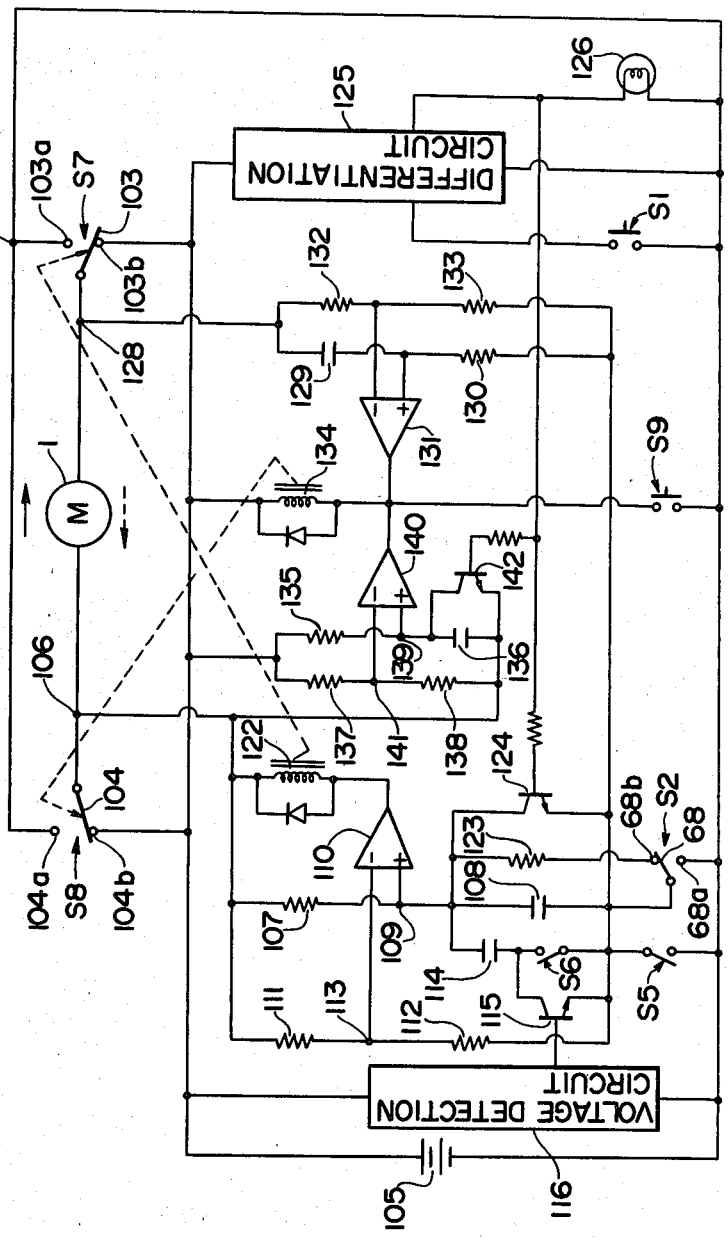
FIG. 7 is a diagram of a motor control circuit of the apparatus of FIG. 1.

In the motor control circuit shown in FIG. 7, there are first and second relay switches S7 and S8 for reversing the motor 1. The motor 1 can advance the photographic film 4 by forward rotation and rewind by reverse rotation. The motor 1 is caused to rotate forward when a movable contact 103 of the first relay switch S7 comes into contact with a contact 103a and a movable contact 104 of the second relay switch S8 comes into contact with a contact 104b, and the motor 1 is reversed when the movable contacts 103 and 104 come into contact with their respective other contacts 103b and 104a.

Figure 10:
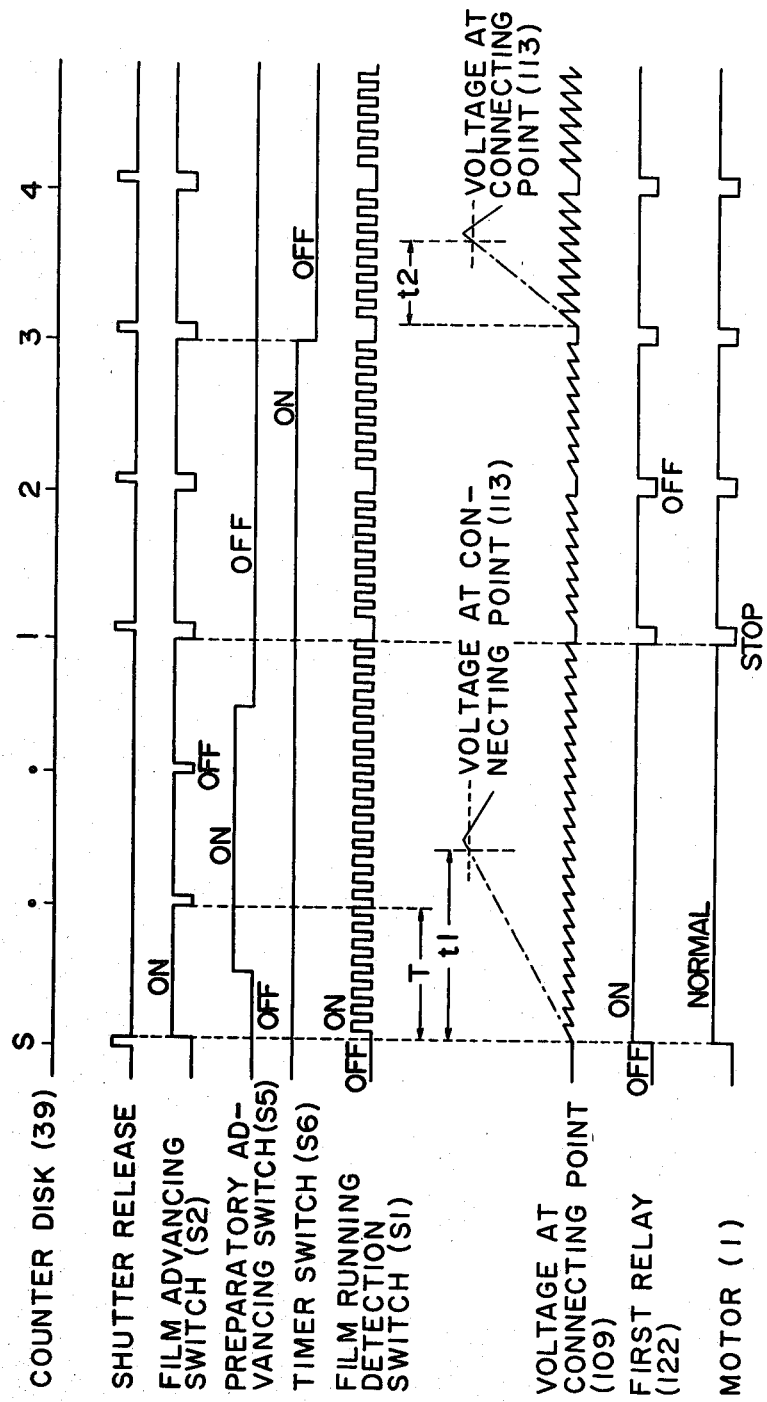
FIG. 10 is a timing chart of the motor control circuit of the FIG. 7, wherein the apparatus is in the film advancing state.

In the motor control circuit, there is provided a CR circuit comprising a fixed resistance 107 and a capacitor 108 connected in series between a connecting point 106 and a film advancing switch S2. To a connecting point 109 between the fixed resistance 107 and the capacitor 108 a positive input terminal of a comparator 110 is connected. A negative input terminal of the comparator 110 is connected to a connecting point 113 between resistances 111 and 112. The capacitor 108 is connected in parallel with a series circuit comprising a timer switch S6 and a capacitor 114. When the timer switch S6 connects the capacitor 114 to the capacitor 108 in parallel, a forward rotation timer circuit is set to an active timer t1 longer than the time T which is required to advance the photographic film 4 a single frame as shown in FIG. 10. Consequently, it is possible to cause the motor 1 to rotate in forward rotation by a given frame in which timer switch S6 is turned on, for instance the third actual frame, of photographic film 4 even if the camera is unloaded. This is very convenient when demonstrating cameras in retail shops.

When the timer switch S6 is turned off, only the capacitor 108 is charged to set the active time of the forward rotation timer circuit to a time t2 which is shorter than the time T which is required to advance the photographic film 4 one frame. If a photographic film 4 is not loaded, or when all the frames of a photographic film 4 have been exposed, the motor control circuit is changed to its reverse rotation mode to cause the motor 1 to rotate in the opposite direction after the lapse of the active time t2. The active time t2 must be long enough to confirm that the film is running, and it is desirable to set the active time t2 with due regard to any possible malfunction of the film running detection switch S1 which might occur, so as to satisfy the following condition:

$$T/2 \leq t2 < T$$

A transistor 115 connected to the timer switch S6 in parallel is caused to be conductive or non-conductive according to output signals from a voltage detection circuit 116. As shown in FIG. 8, a supply voltage is divided by means of resistances 117 and 118. The transistor 119 is caused to be non-conductive when the supply voltage, for instance an initial voltage of 3 V, drops to, for instance, 1.5 V due jointly to the current consumption and the load on the motor 1. When transistor 119 becomes non-conducting, a transistor 115 is caused to be conductive to electrically connect the capacitor 114 to the capacitor 108 in parallel so as to set the active time at a time t1. The active time is longer than time t1, because a reduction in supply voltage produces a reduction in the charging current to the capacitors 108 and 114.

The comparator 110 having an output voltage which is relatively low (the state is hereinafter referred to by the symbol "L") energizes a relay coil 122 thus causing the motor 1 to rotate in forward direction (which is hereinafter called a first relay) to connect the movable contact 103 to the contact 103a of the switch S7. But when the comparator 110 is reversed to be in its high output voltage mode (the state is hereinafter referred to by the symbol "H") the first relay 122 is deenergized after the lapse of the active time t2 or the film advancing switch S2 is turned off.

The film advancing switch S2 is adapted to be turned off by connecting the movable contact 68 the contact 68b every time the photographic film 4 is advanced by one frame, thereby to cause the comparator 110 to be reversed so as to be in "H" output voltage, thereby to deenergize the first relay 122 (which is OFF). The motor 1 can continue to rotate in the forward direction when the preparatory film advancing switch S5 connected in parallel to the switch S2 is turned, even if the film advancing switch S2 is turned off.

A transistor 124 which is connected in parallel to the capacitor 108 is caused to be conductive by receiving a pulse signal from a differentiation circuit 125 such as a one-shot multivibrator so as to cause the capacitor 108 to discharge. The discharge of the capacitor 108 allows the forward rotation timer circuit to be reset with a period predetermined when the photographic film 4 is being advanced. The provision of the differentiation circuit 125 prevents the forward rotation timer circuit from remaining as it is reset even though the driven sprocket wheel 62 stops with the film running detection switch S2 turned on. As shwon in FIG. 7, a lamp 126 connected to the output of the differentiation circuit 125 turns on and off to show the running of the photographic film 4.

The active time of the forward rotation timer circuit, after the third actual frame, is set shorter than the time T which is required to advance the photographic film 4 one frame. As a result, even if the driven sprocket wheel 30 tears perforations of the photographic film 4 when the film 4 is fully extended from the cartridge, the forward rotation timer circuit can operate to reverse the motor 1 before the film advancing switch S2 is turned off and thereby the film rewind operation is started.

Between a connecting point 128 and the film advancing switch S2 there are provided a capacitor 129 and resistance 130 connected in series. A connecting point between the capacitor 129 and the resistance 130 is connected to a positive input of a comparator 132 a negative input of which is connected to a connecting point between resistances 132 and 133. A timer circuit or delay circuit comprising the comparator 131, the capacitor 129 and the resistances 130, 132 and 133 is caused to operate when the movable contact 68 of the film advancing switch S2 contacts the fixed contact 68a thereof at the beginning of film advance so as to delay the occurrence of the reverse in the output voltage of the comparator 131 from an "H" level to an "L" level by a time which is long enough to move the movable contact 103 of the forward rotation relay switch S7 from the contact 103b to the contact 103a. In this case, the movement of the movable contact 103 of the first relay switch S7 to the contact 103a causes the timer circuit to be inoperative so as to maintain the output voltage of the comparator 131 to be at an "H" level. This prevents the first relay 122 and a reverse rotation relay coil 134 (which is hereinafter called the second relay) from simultaneously turning on so as to accomplish a sequential control with accuracy. The timer circuit is operated to delay the operation of the comparator 131 when the movable contact 103 of the first relay switch S7 is shifted from contact 103a to contact 103b for rewinding the photographic film 4 and, after that, the output voltage of the comparator 131 is reversed to an "L" level to energize the second relay 134 so as to shift the movable contact 104 of the second relay switch S6 to the contact 104a. The comparator 131 serves to stop the motor in reverse rotation by deenergizing the second relay 134 when the film advancing switch S2 is turned off upon the completion of rewinding of the exposed film.

Figure 11:
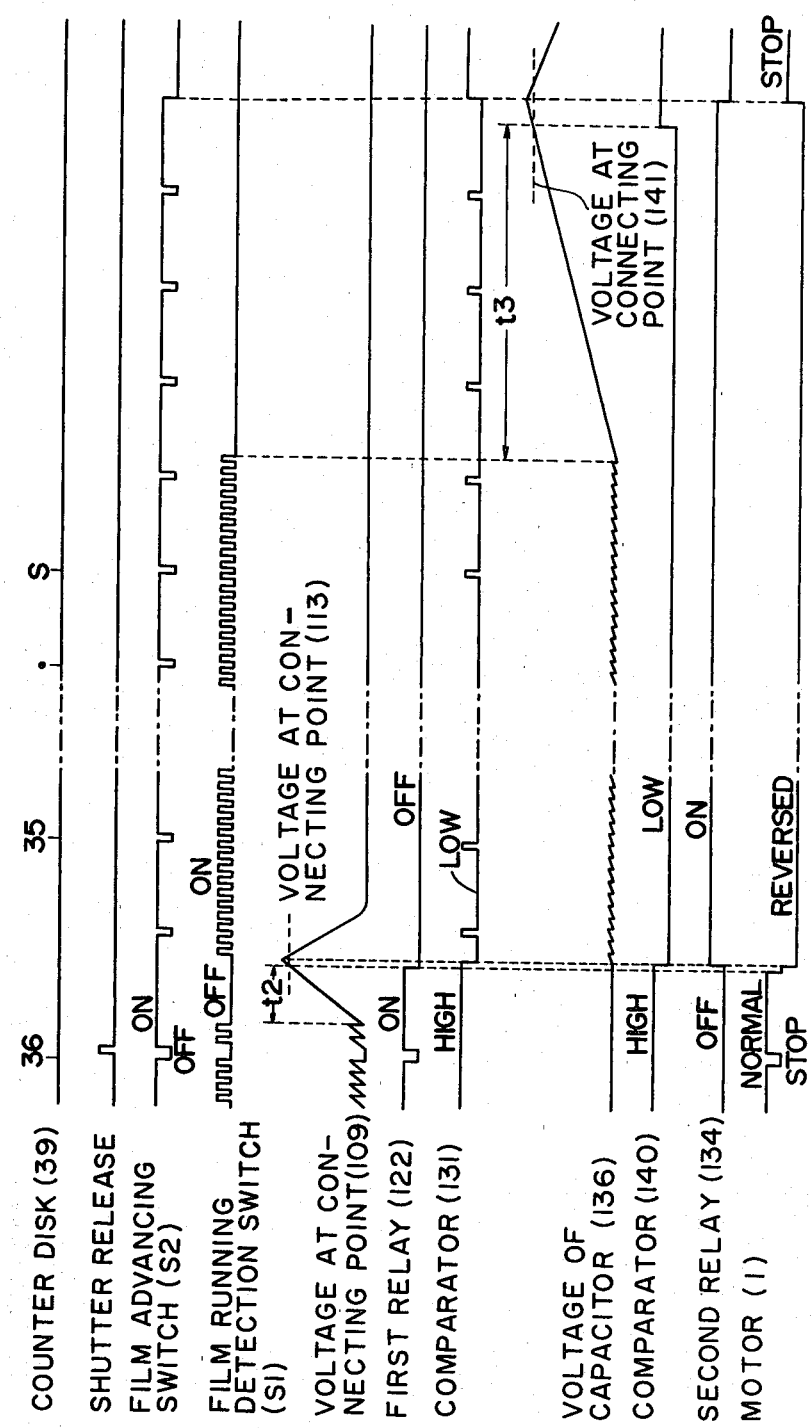
FIG. 11 is a timing chart of the motor control circuit of FIG. 7, wherein the apparatus is in the film rewinding state.

Between the positive electrode of the power source 105 and the connecting point 106, two series circuits are connected, one comprising a resistance 135 and a capacitor 136 and the other comprising resistances 137 and 138. To connecting points 139 and 141 of the respective series circuit, the positive and negative input terminals of comparator 140 are connected, respectively. The reverse rotation timer circuit is caused to operate when the movable contact 104 of the second relay switch S8 is shifted to contact 104a so as to form a circuit for energizing the motor in reverse direction and thereby a return to an "H" level in voltage at the output terminal of the comparator 140 is caused when the voltage at the connecting point 139 is increased to that at the connecting 141 by continuously charging the capacitor 136 for the active time t3 as shown in FIG. 11. It is desirable to set the time t3 relatively long in order to rewind the film entirely into the cartridge. A transistor 142 which is connected to the capacitor 136 in parallel is caused to be conductive by a pulse signal from the differentiation circuit 125.

Since the comparators 131 and 140 are both of the type of open collectors, either of the two comparators can reach the "L" level to energize the second relay 134. The comparator 131 controls when the second relay 140 is energized and deenergized; whilst the comparator 140 operates, when the second relay 140 is being energized, to reverse the motor 1 so as to rewind the photographic film 4 into the cartridge.

The rewind switch S9, which is caused to operate when it is intended to rewind the film from the middle, is turned on to energize the second relay 134. When this happens, since the comparator 140 holds the second relay 134 energized, the motor 1 continuously rotates in the reverse direction even though the rewind switch S9 is turned off.

In the shutter-controlling circuit shown in FIG. 9, the circuit is improved so that there is no current flow through a magnet when the motor 1 is rotating. Therefore, the shutter apparatus is prevented from being actuated, by locking the trifurcated armature lever 85 shown in FIG. 3 even when the shutter release lever 77 is accidentally moved when the photographic film 4 is either advanced or rewound as well as when the batteries in the camera are low in power. A bus line 145 is connected through a switch S4 to the connecting point 106 and a bus line 146 is connected to the connecting point 147. A comparator 150 has a positive input terminal connected to a connecting point between a light-receiving element 148 and an integration capacitor 149, and a negative input terminal connected to a connecting point between resistance 151 and 152. When the charge on the integration capacitor 149, with a current corresponding to the brightness of object to be photographed, reaches a predetermined potential, the comparator 150 reverses its output signal from the "H" level to the "L" level. Between the bus line 145 and the emitter of a transistor 153 which is connected to the output of the comparator 150, the magnet 86 shown in FIG. 3 is provided, for controlling the exposure time. Additionally, a transistor 154 connected to the transistor 153 in series has applied to its base a divided voltage at a connecting point by resistances 155 and 156.

An embodiment of the present invention will be described in operation by referring to FIG. 10 showing a timing charge of a motor control circuit when a photographic film is advanced.

Before using the camera shown in FIG. 1, the camera is loaded as follows:

A leading end of film 4 in a cartridge which is coupled through its spool by the coupling flange 61, is pulled out and engaged through its perforations 4a with teeth 30a and 62a of both the drive sprocket wheel 30 and the driven sprocket wheel 62, respectively. Upon closing the cover door, a movement of the detection means 35a in the direction shown by the arrow in FIG. 1 causes the counter reset lever 35 to rotate counterclockwise so as to bring the intermittent feed shaft 36 into engagement with the ratchet wheel 37. At the beginning of film advancement, as shown in FIG. 3, the shutter actuating lever 72 is in engagement with the lock lever 79, and the free end of the stop lever 75 is within the vertical slot 77b of the shutter release lever 77.

After loading the camera, a depression of the shutter release lever 77 causes the lock lever 79 to rotate clockwise as seen in FIG. 3 so as to allow the shutter actuating lever 72 to be disengaged. The shutter actuating lever 72 is rapidly moved to the right (in FIG. 3) by means of the spring 73 so as to open the shutter blade 90 as described hereinafter. The rising of the shutter release lever 77, when released by the user, allows the free end of the lock lever 75 to engage with the horizontal slot 77a so as to cause the lever 74 to rotate clockwise (FIG. 2) by means of the spring 80. At this time, the control lever 65 operatively coupled to the lever 74 by means of the spring 67 is rotated clockwise (FIG. 2) so that the projection 65a thereof is disengaged from the notch 47a of the control cam 47. Because of the lever 74 being operatively coupled to the stop lever 75, and the spring 67 operatively coupling the control lever 65 and the lever 74, and the control lever 65 being disengageable from the control cam 47 without applying force to the spring 67, an easy and smooth motion of the control lever 67 can be attained and thus the film advancing switch S2 can be positively operated.

The turning on of the film advancing switch S2 through the connection of the movable contact 68 with the contact 68a causes the comparator 110 to be at an "L" level in output as shown in FIG. 10 so as to energize the first relay 122 to shift the movable contact 103 of the first relay switch S7 from the contact 103b to the contact 103a. At the same time, the second relay switch S8 is maintained with contact 104 against the contact 104b since the second relay 134 is deenergized. In FIG. 1, when the motor 1 rotates, the rotation is transmitted through the drive gear 17 frictionally coupled to the rotation shaft 14 and a reduction gear train to the gear 28 to rotate the sprocket shaft 29 through 490°. The rotation of the sprocket shaft 29 causes the drive sprocket wheel 30 to advance the photographic film 4 toward the left in FIG. 1. Additionally, the rotation of the sprocket shaft 29 is transmitted to the spool shaft 13 through the gear 46, the spool drive gear 20 and the cylindrical leaf spring 19 which frictionally connects the spool drive gear 20 to the spool shaft 13, whereby the spool shaft 13 with the take-up spool 2 rotates. Since the spool shaft 13 is subjected to considerable load thereon, the spool shaft 13 is rotated much more slowly than the motor shaft 14.

The photographic film 4 advanced by the drive sprocket wheel 30 is pressed on the periphery of the take-up spool 2 by means of guide rollers 9 and 10 and is thus engaged with wheel tooth 3 through perforations 4a, whereby automatic loading of the film is accomplished. Thereafter, since the photographic film 4 is continuously pressed by means of the rollers 9 and 10, the photographic film 4 can be wound around the take-up spool 2 without slack. Slippage occurring between the cylindrical leaf spring 19 and the spool shaft 13 can counterbalance the difference between the amounts of film advanced by the drive sprocket 30 and wound by the take-up spool 2.

During the advancement of photographic film 4, the driven sprocket 62 is driven by the photographic film 4 so as repeatedly to turn the film running detection switch S1 on and off eight times per frame of the photographic film 4, through the pins 63. The repetition of turning on and off of the film running detection switch S1 causes the differentiation circuit 125 to generate pulse signals which are applied to the pilot lamp 126 and the transistor 124 so that the former goes on and off to indicate film running and the latter is caused to be alternately conductive and non-conductive.

The first switch S6 is held on by the slide contact 97 in contact with the common contact 98b and the contact 98c when the photographic film 4 is being advanced from the first preparatory frame "S" to the third actual frame of film. Therefore, the capacitors 108 and 114 are connected in parallel to provide an active timer t1 longer than the time T which is required to advance a photographic film 4 by a single frame. Furthermore, since the capacitors 108 and 114 are periodically discharged by the transistor 124, the voltage at the connecting point 109 does not rise to the voltage at which the comparator 110 reverses in output signal.

During the film advance, the control cam 47 and the shutter set cam 48 provided on the common shaft of the gear 46 are rotated one full rotation each time the photographic film 4 is advanced by a single frame.

As shown in FIG. 2, the shutter set cam 48 causes, during one half of its revolution, the shutter set lever 69 to swing counterclockwise to move the shutter actuating lever 72 toward the right. The shutter actuating lever 72 causes the integrating switch S3 to turn on and is simultaneously engaged by the lock lever 79 at the leftmost position. An additional half revolution of the shutter set cam 48 allows the shutter set lever 69 to return. The shutter actuating lever 72 with its bent portion 72b engaged with the bent portion 74a of the lever 74 moves, during movement of the shutter actuating lever 72 toward the right in FIG. 2, the lever 74 toward the right against the action of spring 80. The movement of the stop lever 75 with the lever 74 toward the right permits the free end thereof to enter the vertical slot 77b so as to enable the shutter release lever 77 to be depressed. The movement of the lever 74 biases the spring 67 such that the control lever 65 is forced into contact with the control cam 47. When the control cam 47 rotates one full rotation with the shutter set cam 48, the projection 65a engages in the notch 47a after the rotation of the control lever 65 counterclockwise. At this time, the movable contact 68 of the film advancing switch S2 comes into contact with the contact 68b to detect the completion of advancing the photographic film 4 by a single frame.

As shown in FIGS. 4 to 6, when the preparatory second frame of the photographic film 4 is advanced to the exposure station in the camera, a revolution of the intermittent feed shaft 36 rotates the ratchet wheel 37 and the counter disk 39 by two pitches so as to cause the first dot mark to coincide with the index 40. Meanwhile the preparatory film advancing switch S5 is turned on.

In this embodiment, during the advance of three frames of film which are to be preparatorily advanced, the preparatory film advancing switch S5 is maintained on and thereby the motor 1 continues to rotate even if the film advancing switch S2 is turned off. When the preparatory third frame of film is advanced to the exposure station, the control cam 47 forces the control lever 65 to move so as to disengage the projection 65a from the notch 47a to shift the film advancing switch S2. The preparatory third frame of film is advanced in the same manner as described for the preparatory second frame to cause the second dot mark to coincide with the index 40. At this time the shutter set cam 48 rotates one revolution without any interaction since the shutter actuating lever 72 is cocked.

After the preparatory film advance, the first frame of film to be actually exposed is advanced to the exposure station. While the actual first frame is being advanced, the preparatory film advancing switch S5 is turned off since the slide brush 96 is out of contact with the contact 98a. On the other hand, since the film advancing switch S5 is turned on during the film advance, the comparator 110 is maintained in operation. The completion of advancement of the actual first frame of film allows the control lever 65 to move, turning the film advancing switch S2 off. The turning off of the film advancing switch S2 causes the comparator 110 to be cut off from the supply voltage so as to deenergize the first relay 122 and thereby to shift the movable contact 103 of the first relay switch S7 from 103a to 103b, rapidly stopping the motor 1 from rotating by electric damping. Upon the completion of the first frame advance, the counter displays the mark "1" on the counter disk 39 in coincidence with the index 40.

When the shutter release lever 77 is depressed, the switch S4 is turned on in a preliminary stage so as to electrically connect the shutter control circuit to the power source 105. Since the connecting points 106 and 128 are connected to the positive electrode of the power source 105 and the connecting point 147 is connected to the negative electrode, the comparator 150 is at an "H" level at its output so as to energize the magnet 86, thus attracting the armature 85b. In the next stage of the shutter release lever 77 depression, although the V-shaped notch 77d *is facing the hook 85c* of the trifurcated armature lever 85, engagement between the notch 77d and the hook 85c does not occur because the magnet 86 is energized. On the other hand, engagement will occur when the motor 1 is rotating or when the power source 105 is drained of its voltage.

Once the shutter release lever 77 is fully depressed, the lock lever 79 is swung clockwise (FIG. 3) to release the shutter actuating lever 72 so as to cause the shutter actuating lever 72 to move with the exposure control lever 82 toward the right in FIG. 3. The crank lever 88 engaged with the exposure control lever 83 through its hooked end 83a is caused to rotate clockwise against the force of spring 89 when the shutter actuating lever 77 moves, thereby to swing the shutter blade 90 in the direction shown by arrow 92. As previously described, the shutter blade 90 defines an exposure aperture in cooperation with the aperture 93 so as to expose the photographic film 4. At the beginning of the motion of the shutter actuating lever 72, the switch S2 is opened to charge the integration capacitor 149 corresponding to the brightness of the object to be photographed, which is measured by means of the light-receiving element 148. The integration capacitor 149 charged to a predetermined voltage causes the comparator 150 to reverse in its output so as to render the transistor 153 non-conductive. The deenergizing of the magnet 86 causes the armature 85b to be released, whereby the trifurcated armature lever 85 is allowed to rotate clockwise under the action of the spring 87 so as to push one end of the exposure control lever 83. Consequently the swingably rotated crank lever 88 is disengaged from the hooked end 83a to allow the shutter blade 90 rapidly to return, thereby closing the aperture 93 so as to complete the exposure of the actual first frame of photographic film 4.

After completion of the exposure of the actual first frame of photographic film 4, the film advancing switch S2 is again turned on to cause the motor 1 to start to rotate, thereby automatically advancing the photographic film 4 so as to position the second frame in the exposure station. For successive frames, after every picture, the motor 1 is automatically started to rotate in the forward direction, thereby advancing the photographic film 4 by a single frame and simultaneously cocking the shutter apparatus. When the photographic film 4 is advanced to position the actual third frame in the exposure station, the timer switch S6 which is operatively associated with the counter disk 39 is turned off to provide the forward rotation timer circuit for controlling the motor 1 in forward rotation with an active time t2 shorter than that required for advancing the photographic film 4 by a single frame. However, the forward rotation timer circuit will be caused to operate with an actual time by film running signals which are produced by the film running. The operation described for the advance of the third frame of photographic film 4 is repeated for successive film advances.

The rewinding operation will be described with reference to FIG. 11, which shows a timing chart for a motor control circuit in an automatically rewinding mode.

In the case of a loaded cartridge which contains a photographic film 4 with 36 exposable frames, in the course of attempting to advance the actual 37th frame, the mechanism is prevented from advancing further. Therefore, the motor 1 continues to rotate against increased friction between the cylindrical leaf spring 18 and the spool shaft 13. On the occurrence of this condition, the absence of pulse signals produced by the differentiation circuit 125 allows the capacitor 108 to be continuously charged so that the voltage at the connecting point 109 reaches that at the connecting point 113 after the active time t2 has elapsed, whereby the comparator 110 is reversed in output at an "H" level, deenergizing the first relay 122 to stop the motor 1. At this time, since the film advancing switch S2 is in its ON state, the potential at the connecting point 128 becomes positive when the movable contact 103 of the first relay switch S7 is separated from the contact 103a. This causes the comparator 131 to be operative, at an "L" level in output after short time. The comparator 131 with an output of "L" level allows the second relay 134 to be energized, shifting the movable contact 104 of the second relay switch S8 from the contact 104b to the contact 104a. The motor 1 is reversed due to its energizing circuit being reversed. Simultaneously, the comparator 140 becomes operative at an "L" level in output. The motor 1, reversed, causes the drive sprocket wheel 30 to rotate in the direction shown by a dotted arrow in FIG.

1 to rewind the exposed film from the take-up spool 2. The reversed motor 1 simultaneously rotated the coupling flange 61 via the pawl 50, the ratchet 51 and the gear train 52 to 60. The coupling flange 61, which couples the spool of the cartridge, serves to wind up the photographic film 4 advanced by the drive sprocket wheel 30 on the spool. While the photographic film 4 is being rewound, the differentiation circuit 125 provides pulse signals so as periodically the transistor 142 to be conductive and non-conductive. Consequently to render the capacitor 136 alternately charged and discharged so as to maintain the comparator 140 with its output at an "L" level. After the photographic film 4 for the most part is rewound, and the driven sprocket wheel 62 stops due to the disengagement between the teeth 62a and perforations 4a, the differentiation circuit 125 no longer produces pulse signals. Therefore, the pilot lamp 126 stops going on and off and the transistor 142 is caused to be non-conductive. Because the capacitor 136 is charged with a substantially constant current, the comparator 140 is reversed to be at an "H" level in output when the voltage at the connecting point 139 rises to that at the connecting point 141. The second relay 134 is, however, continuously energized since the comparator 131 is at an "L" level in output due to the film advancing switch S2 being in its ON state. At the time the film advancing switch S2 is turned off, the comparator 131 becomes inoperative and is at an "H" level in output so as to deenergize the second relay 134. The shift of the movable contact 104 of the switch S8 to the contact 104b after the deenergization of the second relay 134 causes the motor 1 to stop. At this time the shutter actuating lever 72 has been set to be operable and the projection 65a of the control lever 65 has come into contact with the notch 47a of the control cam 47.

Figure 12:
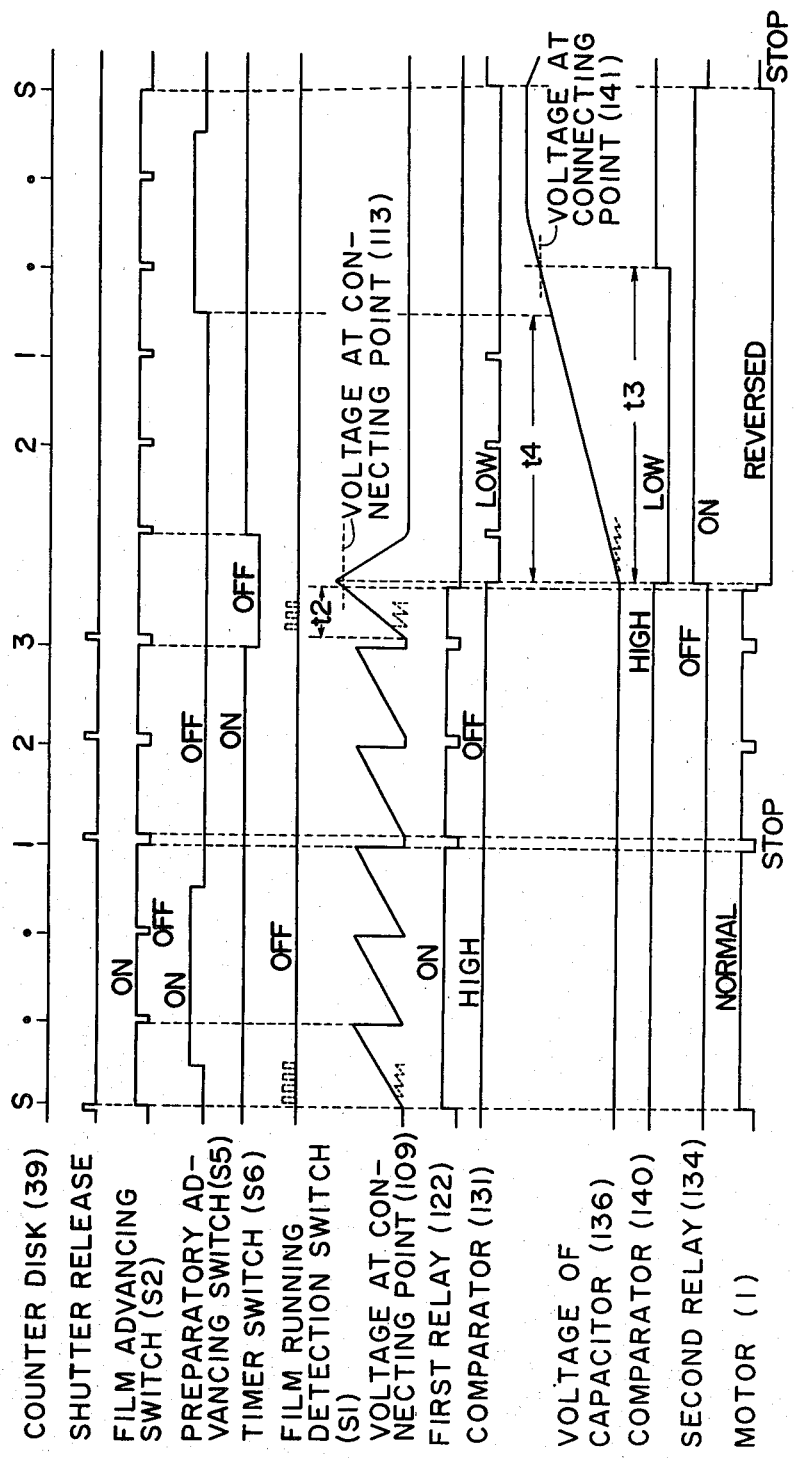
FIG. 12 is a timing chart of the motor control circuit of FIG. 7, which shows the film advancing and rewinding states of the apparatus when empty of photographic film.

FIG. 12 shows a timing chart for the motor control circuit when the camera is not loaded with photographic film.

It is usual in camera shops to operate a camera without a photographic film, for the purpose of demonstration. In the operation of an unloaded camera, automatic film advance for three actual frames and the rewinding operation can be performed by the present invention. As shown in FIG. 12, the timer switch S6 is maintained turned on till the counter disk 39 indicates a figure "3" coincident with the index 40 and the forward rotation timer circuit is set for a time t1. Therefore, since the film advancing switch S2 is turned off before the voltage at the connecting point 109 rises to that at the connecting point 113, the capacitors 103 and 114 are discharged through the film advancing switch S2, which allows the motor 1 to rotate in the forward direction as well when the camera is empty as when the camera is loaded.

After the figure "3" on the counter disk 39 is indicated, the timer switch S6 is turned off to set the forward rotation timer with an active time t2 shorter than the time T which is required to advance the film by a single frame. Furthermore, after the active time t2 has lapsed in the course of advancing the fourth frame of film, the comparator 110 is reserved prior to the turning off of the film advancing switch S2. Consequently the motor 1 is reversed. When the active time t3 has elapsed after the motor 1 is started to rotate in the reverse direction, the voltage at the connecting point 139 will rise to that at the connecting point 141 so as to reverse the comparator 140 to be at an "H" level in output. If the preparatory film advancing switch S5 is turned off when an interval of time t4 shorter than t3 has elapsed, the comparator 131 is maintained at an "L" level in output so as to maintain the second relay 134 energized even when the comparator 140 is reversed in output.

In the course of rewinding the first assumed frame of film to exposure position, although the preparatory film advancing switch S5 is turned off, the comparator 131 is maintained at an "L" level in output due to the film advancing switch S2 being turned on. The turning off of the film advancing switch S2 causes the comparator 131 to be reversed in output signal, stopping the motor 1 from rotating.

FIG. 13 shows a timing chart of the motor control circuit in the case of reduced supply voltage. The shutter apparatus is adapted to be cocked when a half frame of photographic film 4 is advanced. Consequently the load on the motor 1 increases during the time the shutter set cam 48 rotates through 180°, during which photographic film 4 is advanced and the shutter apparatus is cocked. Until the power source 105, which is usually of 3 V, is lowered to 1 V, the motor 1 is properly operative to advance the photographic film 4 and to cock the shutter apparatus. However, if the power source 105 is reduced in supply voltage, the motor 1 rotates only slowly at a reduced speed. Furthermore, the motor 1 rotates still more slowly with the rotation of the shutter set cam 48. As a result of this, the differentiation circuit produces pulses with increased intervals. A reduced voltage of the power source 105 due to the increased load on the motor 1 causes the voltage at the connecting point 113 to decrease. Although a decreased voltage of the power source 105 causes the capacitor 108 to be charged with a decreased charging current, the voltage at the connecting point 109 rises because the charging time will be prolonged. Consequently, the comparator 110 is reversed to be at an "H" level in output at a cross point 158 as shown in FIG. 13 so as to deenergize the first relay 122, thus deeenergizing the forward rotation motor circuit. When current is cut off from the motor 1, the comparator 110 is caused to be again at an "L" level in output, so that the first relay switch S7 induces chattering. When the first relay switch S7 is chattering, the capacitor 129 is charged so as to reverse the comparator 131 to be at an "L" in output, thus energizing the reverse rotation motor circuit. Although the shutter apparatus is cocked at the beginning of the reverse rotation of the motor 1, the comparator 140 is not reversed in output signal even though the motor 1 rotates slowly, since the active time t3 is longer. Thus the motor 1 continues to rotate in reverse direction so as to rewind the photographic film 4 fully.

When the power source 105 is reduced in voltage to a certain voltage VL, for instance 1.5 V, the voltage detection circuit 116 detects the lowered voltage to cause the transistor 115 to be conductive. When the transistor 115 is conductive, a parallel circuit of the capacitors 108 and 114 is formed so as to lessen the rise in voltage at the connecting point 109 owing to the prolongation of the time-constant value. Consequently the comparator 110 is not reversed so as to allow the motor 1 to rotate slowly in the forward direction, cocking the shutter apparatus and advancing the photographic film 4. In case the power source is reduced in voltage to below about 1 V, the motor will be deactuated, so that the motor control circuit becomes inoperative.

The motor control circuit as shown in FIG. 7 is provided with a rewinding prevention circuit which serves to prevent the photographic film 4 from being rewound in the course of film advance when the power source 105 is reduced in voltage. It suffices to provide a reset means for resetting the forward rotation timer circuit when the power source is reduced in voltage.

Figure 14:
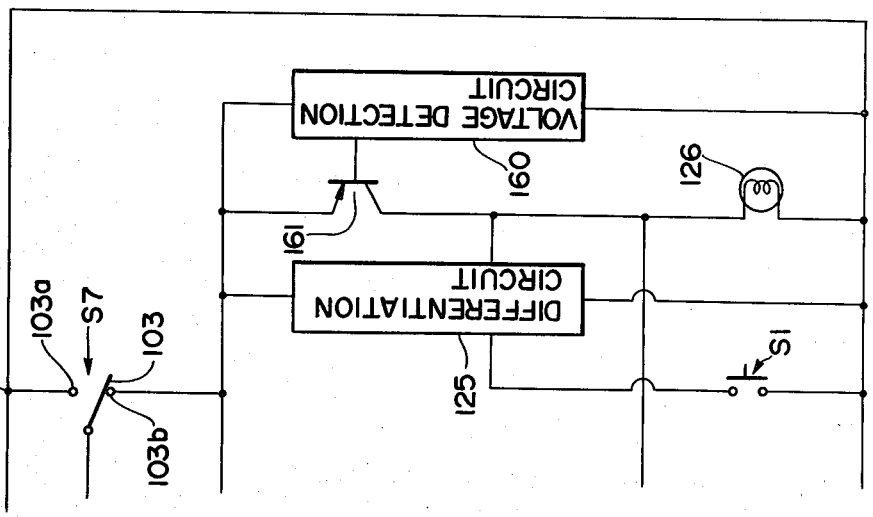
FIG. 14 is a diagram of a circuit for preventing the motor from being reversed.

Another embodiment of a rewind prevention circuit is shown in FIG. 14. In this embodiment, a voltage detection circuit 160 is the same circuit as shown in FIG. 8. When the voltage detection circuit 160 detects the reduced voltage of the power source 105, a transistor 161 is caused to be conductive so as to light the pilot lamp 126 to warn the photographer to change batteries and so as to cause the transistor 124 to be conductive to discharge the capacitor 108.

Figure 15:
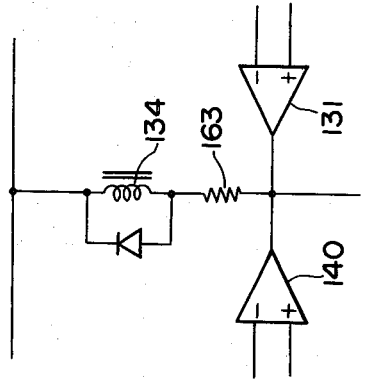
FIG. 15 is a fragmentary circuit diagram showing an alternative embodiment of the circuit of FIG. 14.

Still another embodiment of rewind prevention circuit is shown in FIG. 15. In this embodiment, there is provided a resistance 163 in series with the second relay 134 so as to raise the working voltage of the second relay 134. For instance the resistance 163 can be 3Ω when the resistivities of the motor 1 and the second relay 134 are 1.4Ω and 12Ω respectively, and the supply voltage of the power source 105 is 3 V. When the reduced supply voltage causes the first relay switch S7 to chatter, the amount of current across the second relay 134 is reduced so as to weaken the magnetic force. Thus the second relay switch S7 cannot be connected to the contact 104a even if the comparator 131 is reversed to be at an "L" level in output. This keeps the motor 1 stopped so as to prevent the photographic film 4 in the course of its advance from being rewound. If the first and second relays 122 and 134 differ in working voltage, this will cause difficulty in manufacturing the apparatus. But in this embodiment, only an additional resistance 163 is required, with the result that identical relay means can be employed as the first and second relays 122 and 134, which saves money.

Figure 16:
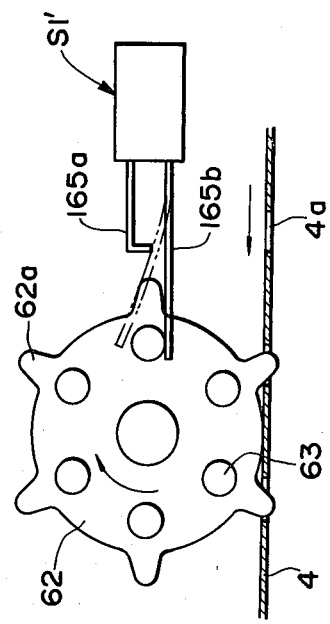
FIG. 16 is a plan view of a device for producing film running signals.

The driven sprocket wheel 62 can have a different stopped position when the film is advanced fully, that is, when the full length of the photographic film 4 has been pulled out of the cartridge. Therefore, it can happen that the film running detection switch S1 will be maintained in its ON position and so will fail to start a film rewinding operation, depending on the stopped position of the driven sprocket wheel 62. To avoid this possibility, the apparatus is provided with a differentiation circuit 125 as shown in FIG. 7. It is, however, to be noted that this can also be prevented by providing a film running detection switch which is changed in structure, without using the differentiation circuit 125. FIG. 16 shows alternative switch means for detecting a photographic film which has been advanced and is to be rewound. A film running detection switch S1' as shown in FIG. 16 is provided with a fixed contact 165a and a resilient movable contact 165b. The movable contact 165b, which is spaced from the fixed contact 165a in its normal position, is adapted to be bent away from its rest position by engagement with a pin 63 on the driven sprocket wheel 62. When released, contact 165b snaps back so as to contact momentarily the fixed contact 165a when the movable contact 165b is released by the pin 63. The switch S1' may produce a plurality of pulses due to the fact that the movable contact 165b vibrates so as to contact the fixed contact 165a several times when the initial distance between the two contacts 165a and 165b is short. The amplitude and/or the number of the vibrations with which the movable contact 165b oscillates can be adjusted by lengthening or weighting the movable contact 165b. In such a way, the pulse length produced by the switch S1' can be varied. Additionally, making the fixed contact 165a resilient serves to vary the pulse length.

From a consideration of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. In a camera having a shutter and reversible motor for advancing and rewinding a photographic film and control means for controlling the motor to rotate in forward and reverse directions, and means automatically to actuate the motor to advance the photographic film one frame after each actuation of the shutter and to rewind the film after all the film has been exposed; the improvement comprising:

rotatable means which is driven by movement of said photographic film;

signal producing means responsive to rotation of said rotatable means for producing first signals;

timer means for measuring a predetermined active time shorter than the time required to advance said photographic film one frame, said timer means measuring also a predetermined active time longer than the time required to advance said photographic film one frame and permitting the motor to rotate in the forward direction when the camera is not loaded with film, for purposes of demonstrating the camera;

reset means for resetting said timer means when said reset means receives a said first signal; and means to reverse the motor to rewind the film when said timer means completes the measurement of said predetermined active time.

2. A camera as defined in claim 1, wherein said rotatable means is a sprocket wheel which is driven by said photographic film.

3. A camera as defined in claim 1, said camera further comprising means for emitting luminous signals upon reception of said first signals.

4. A camera as defined in claim 1, said camera further comprising voltage detection means for detecting when voltage applied to said motor falls below a predetermined value to produce a second signal which is fed to said reset means so as to reset said timer means.

5. A camera as defined in claim 1, said camera further comprising lock means for preventing said shutter from operating during rotation of said motor.

6. A camera as defined in claim 1, said timer means comprising a CR circuit with a resistance and a capacitor connected in series and a comparator supplied with the voltage with which said capacitor is charged, said comparator reversing in its output when said charging voltage reaches a predetermined level.

7. A camera as defined in claim 6, said reset means being a transistor connected to said capacitor in parallel.

8. A camera as defined in claim 2, wherein said first signal producing means comprises means for producing a film movement signal every rotation of said sprocket wheel through a predetermined angle and a differentiation circuit for providing a single pulse as a said first signal for every said film movement signal input thereto.

9. A camera as defined in claim 8, wherein said sprocket wheel has a plurality of equally peripherally spaced projections thereon, and said first signal producing means is a switch having a fixed contact and a movable contact which is greater than said fixed contact in length, said movable contact being resilient and being forced to move away from said fixed contact by engagement with a said projection and to snap back beyond its reset position by disengagement from said projection so as to make contact with said fixed contact for a short time during rotation of said sprocket wheel.

10. A camera as defined in claim 1, and a switch operatively associaed with a counter which counts the number of frames of film advanced, said timer means comprising a CR circuit with a resistance and a first capacitor in series, a second capacitor connected to said first capacitor in parallel through said switch and a comparator which is caused to be reversed in output when a charged voltage to said first capacitor reaches a predetermined level.

11. A camera as defined in claim 10, and a transistor connected with said switch in parallel, and a voltage detection circuit for detecting an applied voltage to said motor lower than a predetermined value to cause said transistor to be conductive.

12. A camera comprising:
a reversible motor for advancing a photographic film in forward rotation and rewinding the film in reverse rotation;
control means for selectively establishing a circuit energizing said motor in forward rotation, a circuit reversing said motor, and a short circuit;
a sprocket wheel driven by movement of said photograhic film;
signal producing means for producing first signals during rotation of said sprocket wheel;
a shutter for exposing sid photographic film;
shutter cocking means operative upon movement of said film;
a release lever for tripping said shutter;
a film advancing switch which is automatically turned on after the shutter is tripped and turned off after said photographic film is advanced one frame;
first timer means operative while said film advancing switch is turned on for measuring an active time shorter than the time required to advance said photographic film one frame, during which active time said control means establishes said motor energizing circuit to energize the motor in forward rotation;
reset means for resetting said timer means when said reset means receives a said first signal; and
reversing control means which is operative while said film advancing switch is turned on to cause said control means to establish said motor energizing circuit to energize the motor in reverse rotation after the lapse of said active time, said motor energizing circuit being maintained in the latter condition until said film advancing switch is turned off after the completion of film rewinding.

13. A camera as claimed in claim 12, further comprising a preparatory film advancing switch connected to said film advancing switch in parallel, said preparatory film advancing switch being adapted to be turned on during the advance of a second preparatory frame of said film and to be turned off during the advance of a first frame of said film to be actually exposed.

14. A camera as defined in claim 13, wherein said preparatory film advancing switch is operatively associated with counter means which indicates the number of frames exposed.

15. A camera as defined in claim 14, wherein said counter means comprises an intermittent feed shaft having two V-shaped grooves 180° apart, a ratched wheel having a plurality of teeth and a toothless portion corresponding to two teeth, said teeth being so disposed as to mesh with one of said V-shaped grooves to be intermittently advanced one pitch for one revolution of said intermittent feed shaft, and a graduated counter disk for indicating the number of frames exposed, said counter disk having two teeth which are disposed on a portion facing said toothless portion of said ratchet wheel and being engageable with said two V-shaped grooves so as to be advanced by two pitches for one revolution of said intermittent feed shaft when preparatorily advancing the second frame of said film.

16. A camera as defined in claim 12, wherein said shutter comprises a shutter blade for allowing said photographic film to be exposed and a shutter actuating lever for causing said shutter blade to move from a first position where said shutter blade closes an exposure aperture to a second position where said shutter blade opens said exposure aperture.

17. A camera as defined in claim 16, wherein said shutter includes shutter cocking means which comprises an eccentric cam rotatable fully once while said motor moves the photographic film one frame, and a shutter cocking lever for moving said shutter actuating lever from said first position to said second position following one half revolution of said eccentric cam means.

18. A camera as defined in claim 17, and a control cam rotatable with said eccentric cam, said control cam having a notch therein; a control lever with a projection which is in contact with the periphery of said control cam and which turns said film advancing switch off when said projection enters said notch; a shiftable lever which is moved from a first position to a second position by said shutter actuating lever moving from said second position to said first position thereof, said lever causing said control lever to disengage said projection from said notch when said lever returns to said first position thereof; a spring acting between said control lever and said shiftable lever, said spring forcing said projection to contact the periphery of said control cam when said shiftable lever is in said second position; another spring for forcing said shiftable lever to return to said first position; and a stop lever for preventing said shiftable lever from returning to said first position when said release lever is depressed.

19. A camera comprising:
a reversible motor for advancing a photographic film in forward rotation and rewinding the film in reverse rotation;
first electrical relay means for allowing said motor to rotate in said forward direction;
second electrical relay means for allowing said motor to be reversed;
a shutter for allowing said photographic film to be exposed, said shutter being cocked during the advance of said photographic film by one frame;
a film advancing switch which is turned on after said advance of said photographic film by one frame and turned off after said shutter is tripped;

first timer means which is operative while said film advancing switch is turned on and said second relay means is deenergized so as to maintain said first relay means energized during the elapse of an active time measured by said first timer means, said active time being shorter than the time required to advance said photographic film one frame;

second timer means which is operative while said film advancing switch is turned on and said first means is deenergized so as to energize said second relay means after the elapse of an active time measured by said second timer means;

third timer means which is caused to be operative when said second relay means is energized so as to maintain said second relay means energized during the elapse of an active time thereof longer than the time to advance said photographic film one frame;

a sprocket wheel which is driven by movement of said photographic film;

signal producing means for producing first signals during rotation of said sprocket wheel; and reset means for resetting said first and third timer means so as to measure each its respective active time when said reset means receives a said first signal.

20. A camera as defined in claim 19, wherein each of said timer means comprises a CR circuit with a resistance and a capacitor connected in series, and a comparator reversible in output when the voltage with which said capacitor is charged reaches a predetermined voltage.

21. A camera as defined in claim 19, and a resistance for raising the working voltage by which said second relay means is actuated, said resistance being connected to said second relay means in series.

22. A camera as defined in claim 19, and a preparatory advancing switch connected to said film advancing switch in parallel, said preparatory advancing switch being turned on prior to advancing said photographic film.

23. A camera as defined in claim 19, wherein said first and second relay means have relay switches each of which is normally connected to a positive electrode of a power source and is shifted to connect to a negative electrode thereof when the respective relay means is energized, each said relay switch being connected to a lead wire which is connected to said motor.

24. A camera as defined in claim 23, wherein said shutter has a control circuit for controlling the exposure time corresponding to the brightness of object to be photographed; a first transistor which is caused to be non-conducting by an output signal from said control circuit; an electric magnet connected to said first transistor in series; and a shutter blade which is caused by said electric magnet to move so as to allow said photographic film to be exposed.

25. A camera as defined in claim 24, and a second transistor connected to said magnet in series; a first conductor for connecting one lead of said motor to a positive terminal of said control circuit; a second conductor for connecting a negative terminal of said control circuit to a negative electrode of said power source; and a third conductor for connecting the other lead wire of said motor to the base of said second transistor.

* * * * *